United States Patent Office 3,012,912
Patented Dec. 12, 1961

3,012,912
NON-FIBROUS REGENERATED CELLULOSE FILM CONTAINING BIS-AMIDE POLYMER AS ANCHOR AGENT
Sewell T. Moore, Stamford, Conn., assignor to American Cyanamid Company, New York, N.Y., a corporation of Maine
No Drawing. Filed July 16, 1958, Ser. No. 748,823
10 Claims. (Cl. 117—145)

The present invention relates to non-fibrous regenerated cellulose film uniformly impregnated with a minor but effective amount of a normally water-soluble cationic non-thermosetting linear carbon chain bis-amide polymer as anchoring agent and to such impregnated film carrying a subsequently applied water-resistant topcoat. The invention includes methods for applying both the polymer and the topcoat to the film.

Non-fibrous regenerated cellulose film is commercially manufactured by extrusion of viscose solution into an aqueous coagulating bath to form a film, clearing and washing the film, passing the film into a plasticizing bath, and drying the plasticized film. The cellulose regeneration step requires a high concentration of sodium sulfate in the coagulating bath.

Film manufactured by the process described is both water-permeable and water-sensitive and cannot be used as wrapping material where moisture resistance is required. Such film is therefore usually provided with an organic moisture-proofing topcoat permitting the product to be used for the packaging of moist substances including foods.

It is known that organic water-proofing topcoats, when applied directly to untreated regenerated cellulose film, rapidly blister and slough off when in contact with moisture. It is further known that this sloughing off can be retarded by first applying a suitable anchoring resin to the regenerated cellulose film, and then applying the topcoat.

Such anchoring resin, in the form supplied, should be freely dispersible in water and have an affinity for cellulose so as to avoid the cost and hazard presented by organic solvents. Then, it should form a highly moisture-resistant odorless, and water-clear bond between the cellulose film and the subsequently applied topcoat.

The present invention principally rests upon the discovery that non-fibrous regenerated cellulose film containing a small amount of a water-soluble cationic non-thermosetting (i.e., thermoplastic) linear carbon chain bis-amide polymer possesses excellent anchoring properties for subsequently applied topcoat material. The invention further rests upon the discovery that such film can be prepared by impregnating at least one surface of the film with an aqueous solution of the polymer, after which the topcoat material may be applied in any appropriate manner without need for curing the polymer in the film.

The bis-amide polymers referred to are wholly or predominantly composed of linkages having the theoretical formula:

(I)
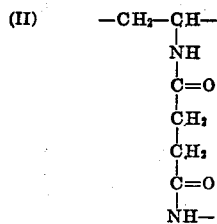

wherein X designates a non-reactive bivalent hydrocarbon radical and Y designates a hydrophilic cationic amino-alkylamido radical.

Thus poly N-vinylsuccinimide aminolyzed with diethylenetriamine yields a polymer having the theoretical formula:

(II)
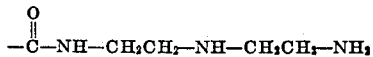
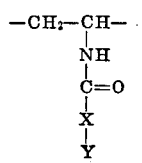
NH—CH₂CH₂—NH—CH₂CH₂—NH₂

In this formula the grouping —CH₂CH₂— is represented by X in generic Formula I above, and the grouping $$-\overset{O}{\underset{\|}{C}}-NH-CH_2CH_2-NH-CH_2CH_2-NH_2$$

is represented by Y.

Other linkages may be present in minor proportion, for example:

(III)
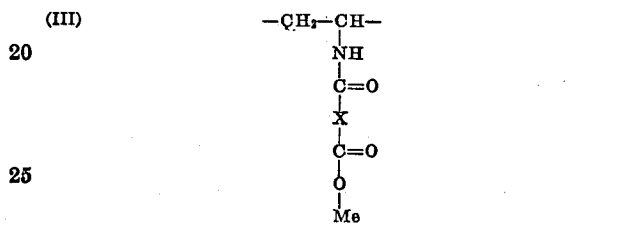

and

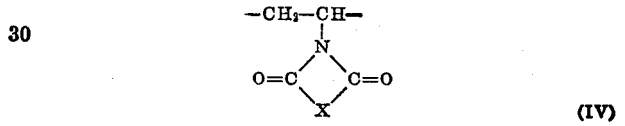
(IV)

where X has the meaning set forth above and wherein Me designates a substituent from the group consisting of hydrogen, ammonium and alkali metal.

Theoretically, it is generally best for the polymer to consist essentially of the first linkage given. It is difficult, however, to prepare such polymer on a commercial scale and in practice, very satisfactory results are obtained from polymers composed essentially of the three linkages identified by formula above, when the numerical ratio of the linkages is between about 6:2:2 and 9:½:½.

The actual structure of the polymer has not been definitely ascertained, except that it is predominantly composed of bis-amide linkages of type (I) above. The evidence is that the polymer is a complex mixture resulting in part from secondary reactions such as hydrolysis occurring during reaction with the polyamine. It will be understood that in instances where this hydrolysis develops carboxyl groups, the polymer may exist as an inner salt, the carboxyl groups being wholly or partly neutralized by the cationic alkylamido radicals.

The invention in preferred embodiments possesses the following principal advantages:

(1) The film is well anchored when treated even at a neutral or alkaline pH. The polymer is stable at pH values between about 6 and 9.

(2) The temperature of the anchoring bath, i.e., the bath containing the polymer, may be high, in the range of 40°–75° C., without significant detriment to the polymer. At such temperature the viscosity of the bath fluid is comparatively low thereby facilitating removal of surplus solution from the film preparatory to drying.

(3) The bath is stable to the presence of salts normally carried therein by the film and in laboratory trials has proved resistant to the presence of as much as 2,500 p.p.m. of Na₂SO₄.

(4) After impregnation, the film may be topcoated immediately as the anchoring agent does not thermocure unless previously reacted with formaldehyde for the purpose.

(5) The film is virtually completely odorless as the anchoring agent does not contain formaldehyde.

(6) Adhesion of topcoat material to the film is excellent, so that the film possesses unusual durability.

More in detail, treated non-fibrous regenerated cellulose film may be prepared according to the present invention as follows.

A plasticizing bath is formed by dissolving a suitable polyhydric alcohol plasticizer such as glycerol in water. Ordinarily such a solution contains about 5% to 20% by weight of the plasticizer. There is then added sufficient of an aqueous solution of an anchoring polymer of the present invention to provide between about 0.005% and 2.5% of the resin on the weight of the solution. The pH of such baths generally falls within the range of 4.0 to 9.0 and such baths may be used without pH adjustment.

More advantageously, however, the pH of the bath is adjusted to fall within the range of about 7.0–8.0, the strength and durability of the film thereby being improved. Moreover, it is common practice to employ the subsequently applied topcoat as a heat-sealing adhesive, a thermoplastic topcoat being used for this purpose. We have found that the bond strength of the thermoplastic topcoat to the regenerated film usually is best when the bath has a pH between 7.0 and 8.0.

Regenerated cellulose film (preferably but not necessarily in wet swollen condition) is then passed through the bath so as to impregnate the film with an effective amount of the polymer. The film may be topcoated in wet condition with latex topcoat material and then dried. Alternately, the film may be dried and topcoat material applied before coiling, or the film may be coiled without topcoat application. The topcoat may be applied later, as when the film is passed through automatic printing-packaging machinery. The film shows little tendency to block when coiled as it comes from the drier without topcoating.

The effect of the resin as an anchoring medium is noted when the dry film contains as little as 0.01% by weight of the anchoring resin, so that there appears to be no minimum amount of anchoring resin which will not produce some beneficial result. Commercially acceptable anchoring generally follows when the film contains about 0.05% of the resin. Larger amounts usually effect somewhat better anchoring, and improvements have been noted up to 5%, but it is a surprising feature that the preferred resins are effective in practically trace amounts, that is, in the range of about 0.05%–0.5%. In practice we therefore prefer to use these very minor amounts. Under normal conditions of impregnating and drying, the weight of polymer in the film (dry basis) is about twice the weight of the polymer in the bath.

The anchoring polymers of the present invention may be prepared by reacting a polymer of an N-vinylimide of a dicarboxylic acid in contact with an alkylenepolyamine at about 100° C. to about 300° C.

Any polymer of an N-vinylimide of an organic dicarboxylic acid including the N-vinylimides of aliphatic, aromatic and heterocyclic dicarboxylic acids may be used. Thus, there may be used the polymers prepared from N-vinylphthalimide, N-vinylsuccinimide, N-vinyl-3-nitrophthalimide, N-vinyl-4-bromophthalimide, N-vinyltetrachlorophthalimide, N-vinylphenylsuccinimide, N-vinylbutylsuccinimide, N-vinylmethylglutarimide, N-vinyldiglycolylimide, N-vinyltetramethylsuccinimide, N-vinylthiodiglycolylimide, N-vinylglutarimide, N-vinyltetrahydrophthalimide, etc. Any method of polymerizing these materials known to those skilled in the art may be used. Thus, any of the processes set forth in U.S. Patent No. 2,276,840 or U.S. Patent No. 2,231,905 may be used.

The term "alkylenepolyamine" is used herein to include not only simple compounds, such as ethylenediamine, 1,3-propylenediamine, etc., but also polyalkylenepolyamines such as diethylenetriamine, triethylenetetramine, tetraethylenepentamine, etc. In general, the alkylenepolyamines which are operable in accordance with this invention are those which conform to the following general formula:

$$NH_2(C_nH_{2n}HN)_xH$$

where $n$ is at least 2, preferably from 2 to 6, inclusive, and $x$ is at least one, preferably from 1 to 5, inclusive.

Most conveniently, the polymers are prepared by a two-step reaction wherein the N-vinylimide is polymerized in anhydrous medium, alone or with diluent vinyl material to form a linear carbon chain polymer containing imide groups, after which the imino groups are wholly or partially reacted with an amino alkylenepolyamine as defined above. The alkylenepolyamine reacts to form an amide so that the polymer contains aminoalkylamido groups (where a material such as ethylenediamine is employed) or aminopoly(alkylamino)amido groups (where materials such as diethylenetriamine are employed).

The polymers show substantial anchoring effect at molecular weights in the range 10,000–50,000, as estimated from viscosity measurements. Anchoring results improve as the molecular weight increases, and the practical molecular weight range appears to be 100,000–1,000,000. With polymers in this range, film of very satisfactory anchoring properties is obtained, while the viscosity of the polymer is not unduly high.

Usually, cellulose film having best anchoring properties is prepared under distinctly acid pH conditions. It is an important feature here that the reverse holds true. Film of the present invention having the best anchoring properties is treated under alkaline conditions. Thus while film treated at pH values as low as 4 possesses good anchoring properties, the film improves in these properties as the point of approximate neutrality is approached, and beyond about pH 6 the film is generally excellent. The improvement continues to the point at which the film is detrimentally affected by alkalinity, which occurs at about pH 9. In practice the range of pH 7–8 is preferred as at this pH value in each instance film of substantially maximum anchoring capacity is obtained and damage to the cellulosic structure is avoided.

The practice of the process of this invention can be extended so as to include the treatment of a variety of non-fibrous cellulosic films. It may be applied to films of regenerated cellulose prepared from solutions of cellulose xanthates, cuprammonium cellulose, cellulose nitrate, cellulose acetate, cellulose acetobutyrate, and the like.

Amongst those water-repellent topcoats which may be used in the final treatment of the cellulosic films after they have been subjected to treatment in the resin bonding bath are those coating compositions containing as the film-forming constituent compounds such as nitrocellulose, cellulose acetate, methyl cellulose, polyethylene, deacetylated chitin, rubber, chlorinated rubber, rubber hydrochloride, ethyl cellulose, butyl methacrylate, moisture-resistant lacquers, waxes such as montan wax, beeswax, carnauba wax, and other conventional film-forming waterproofing materials. The topcoat is not necessarily a continuous film, and may and often does consist of printed legends, revenue stamps, or decorative matter.

The invention will be further described in the following examples which illustrate the invention but are not to be construed as limitations thereon.

*Example 1*

The following illustrates the preparation of a cationic bis-amide polymer according to the present invention.

N-polyvinylphthalimide was prepared by forming a solution of 30 gm. (0.173 mol) of N-vinylphthalimide in 226 ml. of ethylene dichloride and 20 ml. of methanol, purging the solution with nitrogen gas for half an hour, adding 0.3 gm. of benzoyl peroxide, refluxing at 66° C. for half an hour, and reacting at 83° C. for 2 hours with distillation of solvent. The product was washed by pouring into two liters of methanol with vigorous agitation, redissolved in ethylene dichloride, and washed in 2 liters of ethanol. The product was vacuum dried at 50° C.

A bis-amide polymer was prepared by refluxing a mixture of 20 gm. (0.15 mol) of the foregoing polyvinylphthalimide, 96 ml. of water, and 35.3 gm. of ethylenediamine (0.59 mol) at 103° C. for one hour, diluting with 150 ml. of water, and refluxing for 5.5 hours further. The bis-amide polymer was precipitated in acetone, dissolved in dilute aqueous acetic acid to displace unreacted ethylenediamine, and reprecipitated, after which the polymer was dried cryogenically. Its molecular weight, based on its viscosity, was estimated to be 100,000.

Infra-red spectrograms and nitrogen analyses indicated that the polymer was composed of groups having the theoretical formulae:

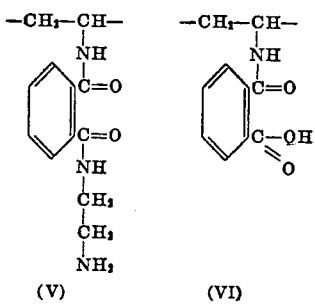

and

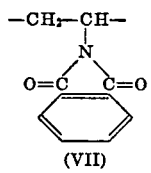

and that the numerical ratio of the three groups in the polymer was respectively about 8.5:1.5:0.5.

The polymer formed a clear neutral solution in water which was absolutely odorless. Evidently the acid groups were neutralized to ammonium form by the combined ethylenediamine.

*Example 2*

The product of Example 1 was tested to determine its effectiveness as anchor agent in non-fibrous regenerated cellulose film by a standard laboratory immersion test, as follows:

A solution of glycerol in water containing 8% of glycerol by weight was divided into portions. One portion was reserved as control and to this nothing was added. To other portions were added amounts of the bis-amide polymer with and without sodium sulfate as shown in the table below, followed by pH adjustment. Sheets of wet swollen washed regenerated cellulose film were immersed in the resulting baths for five minutes, wiped dry, drained, and clamped to wood frames to prevent shrinkage. The films were then oven dried at 95° C. for ten minutes and stripped from the frames. The films were topcoated by dipping into a commercial plasticized nitrocellulose topcoat lacquer solution, drained, air-dried, and oven-dried at 95° C. for five minutes.

Strips were cut from the resulting topcoated films, all edges of the strips being freshly cut, and the strips immersed in water at 85° C. Resistance to sloughing was determined by rubbing the films first frequently and then every two to four minutes between the fingers and averaging the results. Results were as follows.

| Film No. | Anchoring Bath | | Mins. to Slough |
|---|---|---|---|
| | Polymer concn., percent | pH | |
| 1. (control) | None | 7.0 | 7.5 |
| 2. (no Na₂SO₄) | 0.5 | 4.7 | 114 |
| 3. (no Na₂SO₄) | 0.5 | 7.5 | 278 |
| 4. (no Na₂SO₄) | 0.5 | 9.0 | 293 |
| 5. (2,500 p.p.m. Na₂SO₄) | 0.5 | 7.5 | 267 |

I claim:
1. Non-fibrous regenerated cellulose film having as anchor agent a normally water-soluble cationic thermoplastic linear carbon chain bis-amide polymer predominantly composed of linkages having the theoretical formula:

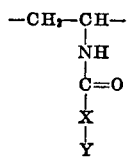

wherein X designates a non-reactive bivalent hydrocarbon radical, and Y designates a hydrophilic cationic aminoalkylamido radical.

2. Film according to claim 1 having a pH between 6 and 9.
3. Film according to claim 1 carrying on at least one side hydrophobic organic topcoat material.
4. Film according to claim 1 wherein Y designates an amino poly(alkylamino)amido radical.
5. Non-fibrous regenerated cellulose film having as anchor agent a normally water-soluble thermoplastic linear carbon chain bis-amide polymer substantially composed of groups having the theoretical formulae:

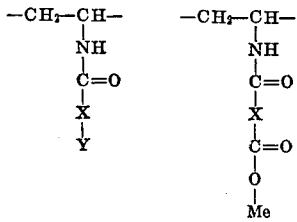

and

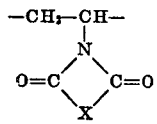

wherein X designates a non-reactive bivalent hydrocarbon radical, Y designates a hydrophilic cationic aminoalkylamido radical, and Me designates a substituent from the group consisting of hydrogen, ammonium and alkali metal, and wherein the numerical ratio of said groups is between about 6:2:2 and 9:½:½.

6. Process for the manufacture of non-fibrous regenerated cellulose film which comprises impregnating said film with an aqueous solution containing as anchoring agent, a water-soluble thermoplastic linear carbon chain bis-amide polymer predominantly composed of linkages having the theoretical formula:

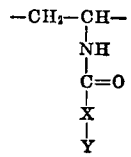

wherein X designates a non-reactive bivalent hydrocarbon radical, and Y designates a hydrophilic cationic aminoalkylamido radical.

7. A process according to claim 6 wherein the temperature of the solution is between about 50° and 75° C.

8. A process according to claim 6 wherein the bath contains up to 2500 p.p.m. by weight of dissolved sodium sulfate.

9. A process according to claim 6 wherein the pH of the bath is between 6 and 9.

10. A process for the manufacture of non-fibrous regenerated cellulose film which comprises impregnating said film with an aqueous solution containing as anchor agent a water-soluble thermoplastic linear carbon chain bisamide polymer substantially composed of groups having the theoretical formulae:

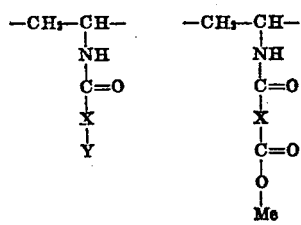

and

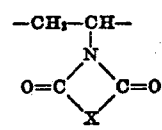

wherein X designates a non-reactive bivalent hydrocarbon radical, Y designates a hydrophilic cationic alkylamido radical, and Me designates a substituent from the group consisting of hydrogen, ammonium and alkali metal, and wherein the numerical ratio of said groups is between about 6:2:2 and 9:½:½, drying said film, and coating at least one side of said film with hydrophobic organic topcoat material.

References Cited in the file of this patent
UNITED STATES PATENTS

| | | |
|---|---|---|
| 2,122,433 | Meigs | July 5, 1938 |
| 2,276,840 | Hanford et al. | Mar. 17, 1942 |
| 2,573,956 | Daniel et al. | Nov. 6, 1951 |
| 2,817,645 | Weisgerber | Dec. 24, 1957 |
| 2,884,054 | Wilson et al. | Apr. 28, 1959 |